United States Patent [19]

Czarnecki et al.

[11] 3,760,117

[45] Sept. 18, 1973

[54] ELECTROMECHANICAL COMMON CONTROL CROSSPOINT TELEPHONE SWITCHING SYSTEM

[75] Inventors: Stephen J. Czarnecki, Lemont; Harry G. Evers, Genoa; Frank Kellogg, Genoa; William W. Newcum, Genoa; Richard F. Vogel, Wheaton; John W. Woodward, Schaumberg, all of Ill.

[73] Assignee: GTE Automatic Electric Laboratories Incorporated, Northlake, Ill.

[22] Filed: Jan. 27, 1972

[21] Appl. No.: 221,236

[52] U.S. Cl. .............................................. 179/18 GE

[51] Int. Cl. .............................................. H04q 3/42

[58] Field of Search ...................... 179/18 GE, 18 E, 179/18 EB

[56] References Cited

UNITED STATES PATENTS

| | | | |
|---|---|---|---|
| 3,681,537 | 8/1972 | Eddy et al. | 179/18 GE |
| 3,502,816 | 3/1970 | Gerke et al. | 179/18 E |
| 2,573,889 | 11/1951 | Boswau | 335/112 |
| 3,544,730 | 12/1970 | Voss | 179/18 E |

*Primary Examiner*—Kathleen H. Claffy
*Assistant Examiner*—Kenneth D. Baugh
*Attorney*—K. Mullerheim et al.

[57] ABSTRACT

A common control crosspoint switching system, employing electromechanical switching matrices of the terminal-per-station type, wherein the matrix connections are such that the originating and terminating markers are completely indepedent (requiring no interfacing or interlocking) to perform their respective originating and terminating connections.

10 Claims, 1 Drawing Figure

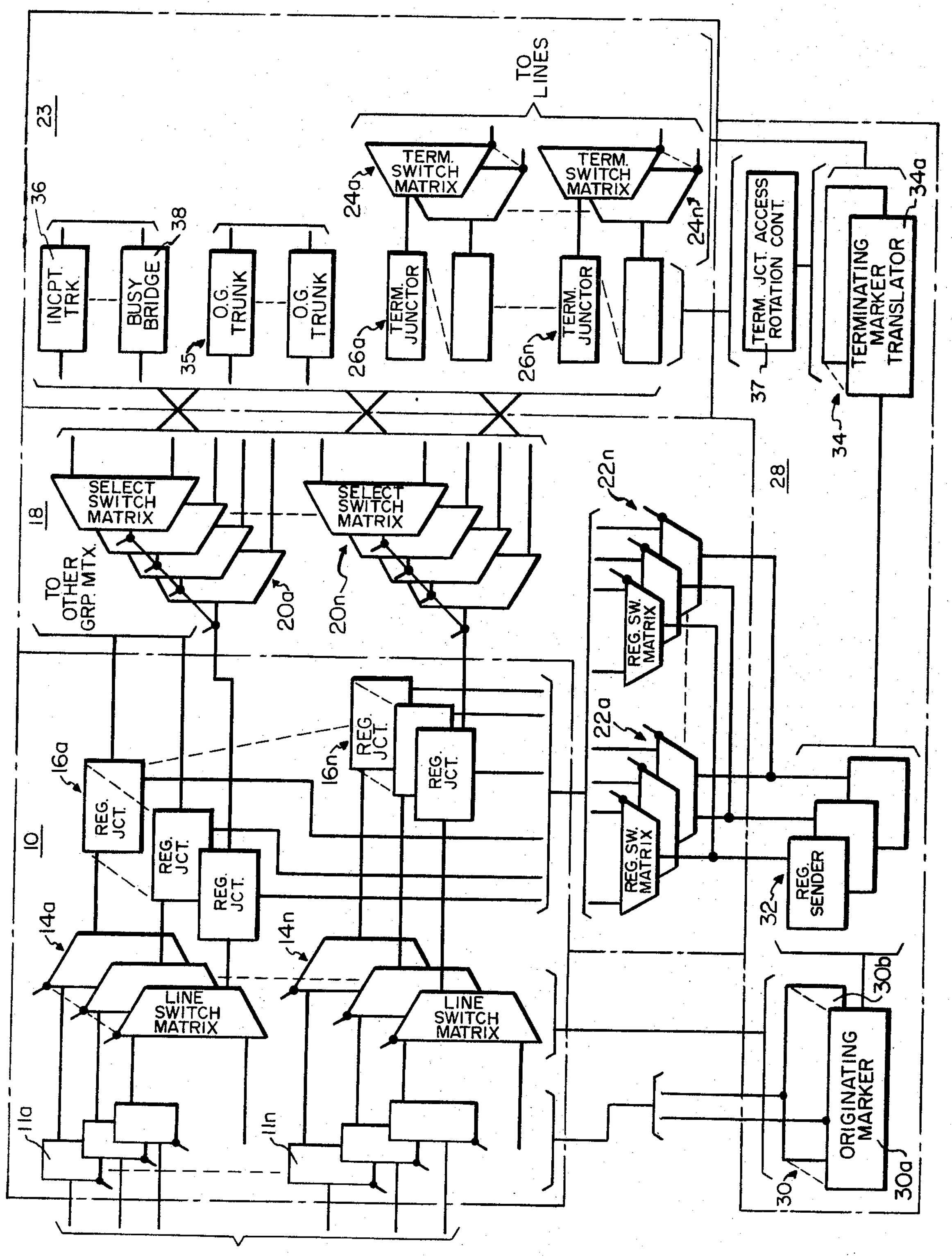
23
TO LINES
INCPT. TRK.
BUSY BRIDGE
O.G. TRUNK
O.G. TRUNK
TERM. SWITCH MATRIX
TERM. SWITCH MATRIX
TERM. JUNCTOR
TERM. JUNCTOR
TERM. JCT. ACCESS ROTATION CONT.
TERMINATING MARKER TRANSLATOR
36
38
35
24a
24n
26a
26n
37
34
34a
18
SELECT SWITCH MATRIX
SELECT SWITCH MATRIX
TO OTHER GRP. MTX.
20a
20n
22a
22n
28
REG. SW. MATRIX
REG. SW. MATRIX
10
REG. JCT.
16a
16n
REG. SENDER
32
14a
14n
LINE SWITCH MATRIX
LINE SWITCH MATRIX
11a
11n
ORIGINATING MARKER
30
30a
30b

ELECTROMECHANICAL COMMON CONTROL CROSSPOINT TELEPHONE SWITCHING SYSTEM

BACKGROUND OF THE INVENTION

1. Field of the Invention

The present invention relates to the field of telephony and in particular to a new and improved crosspoint switching system with electromechanical common control.

2. Description of the Prior Art

Prior to the present invention the small telephone office has suffered from a general unavailability of switching equipment which was on the one hand economically feasible for small offices and on the other capable of providing the modern features such as touch calling and meeting the translation requirements of an extended area service network. Since the advanced electronic common control switching systems are practical only when used in relatively large office (e.g. 10,000 line) installations, the smaller offices (e.g. 100 to 2,000 lines) have essentially been restricted to the older and well known step-by-step switching systems. Thus among the small telephone offices there has existed a continuing need for an economical modern switching system which offers the economy of the electromechanical systems as well as the efficiency of the electronic common control system.

The electromechanical common control central telephone office is not unknown in the art, however, those which are both economical and available are of the so-called terminal-per-line type. This type of system is limited as to the number of directory numbers which are assignable and thus do not offer the growth potential which is desirable in many smaller office installations.

OBJECTS AND SUMMARY OF THE INVENTION

From the foregoing discussion it will be understood that among the various objectives of the present invention are included the following:

to provide a new and novel electromechanical common control crosspoint switching system;

To provide a system of the above-described character using switching matrices of the terminal-per-station type, and to provide a system of the above-described character which is economical of construction for relatively small central telephone offices.

These and other objects of the present invention are efficiently achieved by providing an originating marker which in response to a call for service sets up a path through a line matrix to a first available register junctor and register-sender. After the dial tone is returned to the subscriber the register-sender receives the dialed digits and forwards the information to a terminating marker translator for proper routing. The translator looks for the first available terminating junctor and terminating matrix switch. The called line is marked in the terminating matrix and the status of the called line is checked. If idle, the terminating junctor passes the selector location to the selector matrix switch of the register junctor associated with the calling line. The terminating junctor applies ringing potential to the called line and when the called subscriber answers, a transmission path is established between the calling and called subscribers. Once the talking path is established the originating marker, register-sender, and terminating marker translator are released.

These and other objects, features and advntages of the present invention will become more apparent from the following detailed description taken in conjunction with the appended drawing.

BRIEF DESCRIPTION OF THE DRAWING

The single appended drawing is a schematic block diagram of an electromechanical common control crosspoint switching system constructed in accordance with the principles of the present invention.

DESCRIPTION OF THE PREFERRED EMBODIMENT

With reference now to the appended figure there is illustrated a switching system in accordance with this invention. The system comprises four basic subsystems; an originating section 10 including the line circuit 11, line switch matrix 14 and register junctor 16; a connecting section 18 including a selector group matrix 20 and register switch matrix 22; a terminating section 23 including a terminating switch matrix 24, terminating junctor 26; trunks 35 and bridges 36 and 38; and finally a control section 28 including an originating marker 30, register-sender 32 and terminating marker translator 34.

For purposes of reliability it is preferred that two originating markers 30a and 30b are provided per system. Either may identify the calling line circuit 11 and establish a path from the calling line 11 or incoming stop-dial trunk, through the line matrix 14 to the register junctor 16 and assigns the register-sender 32 to be used for the call. Both originating markers 30 process separate calls simultaneously and the register junctor 16 and register-sender 32 assignments are sequenced between the markers 30. Once the originating marker 30 identifies the calling circuit and connects it to a register-sender 32 the marker 30 is released to handle other calls. The register-sender 32 continues to hold the register switch 22 and the register junctor 16 under the control of the calling line 11 until the appropriate selector switch 20 is extended to the terminating circuit. When the terminating circuit is connected, and the register-sender 32 completes its functions the register switch 22 release the register junctor 16, transfers the calling line to the terminating circuit and the register-sender 32 releases. The register junctor 16 is held by the terminating circuit which in turn holds the line switch 14 and selector switch 20 operated.

The circuitry of the originating markers 30 is preferably arranged to handle a specified maximum number of originating access groups; i.e. groups of lines and trunks which have access to a particular group of register junctors 16. By way of illustration the local access circuitry of the originating marker may be arranged such as to permit splitting a 100 inlet line matrix group; e.g. 14*n*, into two originating access groups. Thus the same line matrix group 14*n* may be used for both prepay paystations and for regular subscriber lines, etc.

The line matrix groups 14, selection matrix groups 20, register matrix groups 22 and terminating matrix groups 24 may each conveniently be built up of a common type of crosspoint switch. Of particular utility is a four conductor, 100 outlet crossbar switch of the type described in U.S. Pat. No. 2,573,889 which issued to Hans P. Boswau on Nov. 6, 1951. In the application of this particular switch to the register switches 22 of the present invention it is easily adapted to use as an eight conductor, 50 outlet switch which has been found by the Applicants to be convenient.

A number of register-senders 32 are provided in accordance with the traffic requirements of the office, based on the probability that not more than a given percentage of busy hour calls will encounter a dial tone delay in excess of a given amount of time. Each register-sender 32 is associated with a register switch 22 of the crossbar type. A particular register-sender which has been found by the applicants to be useful in the practice of this invention is described in U.S. Pat. No. 3,299,438 which issued to I.V. Coleman et al on Jan. 17, 1967.

It is further preferred in order to insure systems reliability that two terminating marker translators 34 be provided per system, each of which receives the called number information and the originating class mark from the register-sender 32. The terminating marker translator 34, by internal strapping fields, controls and routes the call to the required circuit; i.e. outgoing trunk 35, terminating junctor 26, intercept junctor 36 or busy bridge circuit junctor 38.

The line circuit 11 extends a call for service to the local access control until the originating marker 30 selects a register-sender 32 and establishes the connection to the calling line. The line matrix 14 includes a plurality of line matrix groups 14*a*, . . . 14*n*, each for example a conventional 100 point four conductor crosspoint switch of the type known in the art. Under the control of the originating marker 30, the line matrix 14 connects the calling line 11 to the register junctor 16. The switch is held operated under the control of the register junctor 16 which is in turn held operated by the accessed circuit. The register junctor 16 thus provides the interface between the associated line matrix 14, the register-sender 32 and the associated selector matrix 20. Typically there may be twenty register junctors per line matrix group 14.

The selector switches 20 are positioned by the terminating circuit, which marks its individual tens and units appearance on the common selector allotter multiple busses after the register-sender 32 operates the allotter relays of the associated switch 20. Since each terminating circuit marks its own individual multiple appearance on the selector matrix 20, it is unnecessary to reserve multiple appearances for the later expansion of a terminating group. Terminating circuits required for expansion may be assigned to any available multiple appearance without regard to the locations of other circuits of the group.

The illustrated system may employ a single selector matrix 20 having up to four crosspoint switches for each register junctor 16, thus providing up to four hundred outlets respectively. In this manner only the minimum number of matrices need be provided to meet a given requirement and expansion matrices may easily be added as necessary.

The terminating matrix 24 may also be formed of four conductor crosspoint switches, one group being used for each terminating junctor 26. The number of switches required per group will be determined by traffic requirements. It is preferred that incoming stop dial trunks of either the dial pulse or multifrequency type be terminated at the line matrix 14 in order to eliminate the need for further line circuits. Incoming non-stop dial trunks, of course, require a separate group of register-senders and associated access switches. Thus separate incoming trunks to register-sender connect circuitry may be provided to insure fast seizure of the register-sender on incoming calls. Correspondingly, outgoing trunks are preferably accessed on the selector matrix 20.

In addition to the normal groups of terminating junctors 26 and as stated above additional terminating junctor circuit 38 provides a selector matrix path to a busy bridge circuit and access to a mechanical recorder-announcer for invalid code intercept and/or routing restriction. Terminating junctor circuit 36 may provide a terminating matrix outlet for vacant, changed and/or unassigned directory number intercept.

The system may further be provided with a terminating junctor access rotation control circuit 37 in order to insure equal usage of the individual circuits in the various circuit groups. For example, two successive attempts to engage the same terminating junctor group 26 will each involve a different terminating junctor circuit within that group.

The system of the present invention will be more easily understood through a description of its operation in switching a local-to-local and a local-to-trunk call.

When a subscriber phone (not shown) goes off-hook, a call for service mark is forwarded to the originating marker 30 via the hundreds access control. At this time, the originating marker 30 sends out a mark to the marker control which seizes the first available register-sender 32. At the same time, the originating marker 30 sends another mark to the first available register-junctor 16 within the hundreds group of the line 11 calling for service. The calling line's location is placed onto the allotter multiple of its matrix by the originating marker 30. The register-junctor 16 location is also placed onto the register matrix allotter multiple. The selected register junctor 16 causes operation of its associated line matrix switch allotter; the selected register-sender 32 operates its associated register matrix switch allotter. A path is thus established from the calling line 11 to the register-sender 32. Following the originating class mark acquisition cycle (utilizing a lead from the register-sender to the calling line's line matrix multiple), the register-sender 32 provides dial tone to the calling line 12. At this point, the calling line's line circuit 11, the calling line's location in the line matrix 14, the register junctor 16 associated with the line matrix 14, the register junctor 16 location in the register junctor switch 22, and its associated register-senders 32 are involved in switching the call.

The seven digit number is received by the register-sender 32. After receipt of the first three digits, the register-sender 32 passes this information to the terminating marker translator 34 for pre-translation if required. On local-to-local calls, the register-sender 32 is instructed to look for four more digits.

After the register-sender 32 has receieved all seven digits, it passes this information again to the terminating marker translator 34. The terminating marker translator 34 identifies the called party's terminal from the last four digits. In this case, a local number has been requested, therefore, the terminating marker translator 34 determines the terminating junctor group 26 of the called number from the thousands and hundreds digits. The terminating marker translator 34 sends a mark to the terminating junctor access rotation control 37 which in turn seizes the first available terminating junctor 26 and its associated terminating matrix switch in the terminating matrix group 24. At the same time, the terminating marker translator 34 passes the tens and units of the called number to the allotter bank of the terminating matrix 24.

The terminating marker translator 34 performs a check of the called line for either a busy, revert call, idle or vacant terminal condition. If the line is idle, the marker translator 34 sends a mark to the terminating junctor 26 which causes it to mark its tens and units identity on the selector matrix switch 20 allotter highway. Since the selector matrix switch 20 allotters were previously operated by the register-sender 32 under the control of the terminating marker translator 34, a connection is established from the register-sender 32 to the terminating junctor 26 via the selector matrix switch 20. The terminating junctor 26 forwards a "complete" mark to the terminating marker translator 34 and all of the common equipment is released at this point. The terminating junctor 26 performs the necessary ringing, battery feed and ring trip functions.

After the connection has been established from the calling line to the called line, the following equipment is in use; calling party line circuit 11, line matrix switch 14, register junctor 16, selector matrix switch 20, terminating junctor 26, terminating matrix switch 24, and called line circuit.

In switching a local-to-trunk call, after receipt of dial tone by the calling line 11 as described above, the subscriber dials the seven digit extended area service type call. The digits are received into the assigned register-sender 32 as with the local-to-local call. The register-sender 32, after receipt of the first three digits, passes this information to the terminating marker translator 34 for pre-translation. After the terminating marker translator 34 identifies the call from the first three digits as an extended area service trunk call, the register-sender 32 is directed to receive four more digits. After the register-sender 32 receives all seven digits, it again passes this information to the terminating marker translator 34 for proper routing. The terminating marker translator 34 determines the proper trunk group from the first three digits and the originator's class mark, and marks this trunk group in the access rotation control 36 which in turn marks the first available trunk 35 in that group. At that time, the trunk 35 marks its selector location leads on the allotter highway to the selector matrix switch 20. Under the control of the terminating marker translator 34, the register-sender 32 operates the selector matrix switch 20 allotters associated with the calling register junctor 16. Then the connection from the register-sender 32 to the outgoing trunk 35 is established, the trunk forwards a "complete" mark to the terminating marker translator 34 which responds with an instruction to the register-sender 32 as to the mode of signaling (i.e. multifrequency or dial pulses), the number of digits to be outpulsed and miscellaneous other instructions and then releases. The register-sender 32 now outpulses the digits necessary to extend the call and the common equipment is then released.

From the preceding description it will be understood that the Applicants have provided a new and novel electromechanical, common control crosspoint switching system whereby the objectives set forth hereinabove are efficiently achieved. Since certain changes in the above-described construction will occur to those skilled in the art without departure from the scope of the invention it is intended that all matter contained in the description or shown in the appended drawing shall be interpreted as illustrative and not in a limiting sense.

Having described what is new and novel and desired to secure by Letters Patent, what is claimed is:

1. A common control electromechanical crosspoint communications switching system comprising originating means including a plurality of line circuits, a plurality of register junctor circuits, and a line switch matrix coupled at one side to said line circuits, and at the other side to said register junctor circuits, and selectively operable to couple said line circuits to said register junctor circuits;

terminating means including a plurality of terminating circuits, a plurality of terminating junctor circuits, and a terminating switch matrix coupled at one side to said terminating circuits and at the other side to said terminating junctor circuits and selectively operable to couple said terminating circuits to said terminating junctor circuits;

connecting means including a selector switch matrix coupled at one side to said register junctor circuits, at the other side to said terminating junctor circuits, and operable to selectively couple said terminating junctor circuits to said register junctor circuits;

control means including a register-sender coupled to said register junctor circuits, an originating marker coupled to said line circuits, to said line switch matrix and to said register-sender, and a terminating marker coupled to said terminating circuits, to said terminating switch matrix, to said terminating junctor circuits, and to said register-sender, said originating marker operative to receive an originating signal from any of said plurality of line circuits, to condition said line switch matrix for operation and to forward said originating signal to said register-sender, said register-sender operative in respone to said originating signal to select one of said plurality of register junctor circuits thereby operating said conditioned line switch matrix to establish an electrical path therethrough from said line circuit to said register junctor circuit, and to forward a terminating signal to said terminating marker, said terminating marker operative in response to said terminating signal to select one of said plurality of terminating junctor circuits to thereby condition said terminating switch matrix for operation, and mark the identity of said terminating circuit, thereby operating said conditioned terminating switch matrix to establish an electrical path therethrough from said terminating circuit to said terminating junctor circuit, and said selected register junctor circuit operating to condition said selector switch matrix for operation, and said selected terminating junctor circuit operating to establish an electrical path through said conditioned selector switch matrix thus coupling said line circuit with said terminating circuit.

2. A switching system as recited in claim 1 further including a register switch matrix coupled at one side to said register-sender and at the other side to said plurality of register junctor circuits, adapted to be conditioned for operation by said register-sender and operated by selection of said register junctor to thereby establish an electrical path between said register-sender and said register junctor.

3. A switching system as recited in claim 1 further including means coupled between said terminating marker and said plurality of terminating junctor circuits for controlling the access thereto by said terminating marker.

4. A switching system as recited in claim 1 wherein said control means includes a plurality of originating markers each coupled to said line circuits, to said line switch matrix, and to said register-sender and simultaneously operative to establish separate electrical paths through said line switch matrix between separate line circuits and register junctor circuits.

5. A switching system as recited in claim 1 wherein said originating marker is released in response to the operation of said conditioned line switch matrix 6. A switching system as recited in claim 4 wherein said control means includes a plurality of terminating markers each coupled to said terminating circuits, to said terminating switch matrix, to said terminating junctor cricuits, and to said register-sender and simultaneously operative to establish separate electrical paths through said terminating switch matrix between separate terminating circuits and terminating junctor circuits in response to separate terminating circuit identifying signals.

7. A switching system as recited in claim 1 wherein said terminating marker is released in response to the operation of said conditioned selector switch matrix.

8. A switching system as recited in claim 1 wherein said line switch matrix, said terminating switch matrix and said selector switch matrix each comprise four conductor crossbar switch.

9. A switching system as recited in claim 2 wherein said register switch matrix comprises an eight conductor crossbar switch.

10. A switching system as recited in claim 1 further including a plurality of bridge circuits coupled to the terminating junctor side of said selector switch matrix, and to said terminating marker, and means included in said terminating marker for detecting the status of said terminating circuits and marking one of said bridge circuits in response to the detection of said identified terminating circuit as being other than idle.

* * * * *

UNITED STATES PATENT OFFICE
CERTIFICATE OF CORRECTION

Patent No. 3,760,117 Dated September 18, 1973

Inventor(s) S.J. Czarnecki, H.G. Evers, F. Kellogg, W.W. Newcum, R. F. Vogel, and J. W. Woodward It is certified that error appears in the above-identified patent and that said Letters Patent are hereby corrected as shown below:

Column 6, Line 38, change "respone" to read - - "response"

Column 7, Line 21, change "cricuits" to read - - "circuits"

Column 8, Line 10, before "four" add - - "a"

Signed and sealed this 18th day of December 1973.

(SEAL)
Attest:

EDWARD M.FLETCHER,JR.
Attesting Officer

RENE D. TEGTMEYER
Acting Commissioner of Patents